United States Patent [19]

Walker

[11] Patent Number: 4,682,501
[45] Date of Patent: Jul. 28, 1987

[54] TEMPERATURE COMPENSATED BOURDON TUBE GAUGE

[76] Inventor: Thomas Walker, 15608 Pamela, Silver Spring, Md. 20904

[21] Appl. No.: 721,838

[22] Filed: Apr. 11, 1985

[51] Int. Cl.$^4$ ............................ G01L 7/04; G01L 19/04
[52] U.S. Cl. ............................................ 73/708; 73/714; 73/743; 374/143
[58] Field of Search .................. 73/708, 741, 742, 743, 73/740, 714; 374/143; 116/216, 220, 221, 266

[56] References Cited

U.S. PATENT DOCUMENTS

| | | | |
|---|---|---|---|
| 2,239,221 | 4/1941 | Dimmock | 374/143 |
| 2,387,909 | 10/1945 | Ingham, Jr. | 73/393 |
| 3,004,434 | 10/1961 | Heise | 73/411 |
| 3,127,771 | 4/1964 | Diehl | 73/345 |
| 3,302,460 | 2/1967 | Hennecke et al. | 374/143 |
| 3,641,820 | 2/1972 | Bissell | 73/418 |
| 3,815,417 | 6/1974 | Smialowicz | 374/143 |
| 4,143,545 | 3/1979 | Sitabkhan | 73/146.8 |

FOREIGN PATENT DOCUMENTS 880957 6/1953 Fed. Rep. of Germany ...... 116/220

Primary Examiner—Donald O. Woodiel
Attorney, Agent, or Firm—Saul Elbaum; Thomas E. McDonald; Alan J. Kennedy

[57] ABSTRACT

A temperature-compensated Bourdon tube gauge for indicating a parameter of a pressurized fluid, including a support structure, a Bourdon tube having an open fixed end receiving the fluid and a free closed end carrying an indicating member, a dial member carrying a parameter scale disposed along the path of motion of the indicating member, and a temperature-responsive element for moving the dial member in accordance with a sensed temperature such that the indicating member indicates the fluid parameter on the dial member scale. The temperature-responsive element comprises a bimetallic element connected between the support structure and the dial member. The bimetallic element may be connected to the dial member by a lever having a "variable fulcrum" which varies along the length of the lever in accordance with the shape of a cam with which the lever is maintained in contact.

11 Claims, 8 Drawing Figures

TEMPERATURE COMPENSATED BOURDON TUBE GAUGE

RIGHTS OF THE GOVERNMENT

The invention described herein may be manufactured, used, or licensed by or for the government of the United States of America for governmental purposes without payment to me of any royalties therefor.

BACKGROUND OF THE INVENTION

The invention relates generally to Bourdon tube instruments such as pressure gauges, and, more particularly, to a Bourdon tube gauge in which the effects of variations in the ambient temperature are substantially compensated.

U.S. Pat. No. 3,641,820, issued Feb. 15, 1972 to Bissell, describes a relatively simple and inexpensive Bourdon tube pressure gauge in which the free end of the Bourdon tube is provided with an integral pointer which is movable relative to a calibrated dial plate for indicating the value of pressure being sensed. This pressure gauge is not temperature compensated, and thus will have a temperature-induced error when the ambient temperature varies from the ambient temperature at which the pressure gauge was calibrated. To correct for these temperature-induced errors, the ambient temperature must be measured and correction charts utilized to obtain the correct pressure.

In temperature-compensated Bourdon tube pressure gauges, such as those described in U.S. Pat. No. 2,387,909, issued Oct. 30, 1945 to Ingham, Jr., and U.S. Pat. No. 3,004,434, issued Oct. 17, 1961 to Heise, the free end of the Bourdon tube is connected to a rotatable pointer by a linkage assembly which includes a bimetallic element for adjusting the linkage in accordance with the ambient temperature so that the pointer indicates on a calibrated dial the correct value of pressure being sensed.

Bourdon tube gauges are also extensively used to monitor the fullness of a fire extinguisher tank, that is, to measure the mass of a fire suppressant fluid within the tank relative to the mass of the fire suppressant fluid when the tank is fully charged. Since the volume of the fire extinguisher tank is fixed, the pressure of the working fluid within the tank will be a measure of the mass of this fluid at any given ambient temperature. However, the fluid pressure indicating a fully charged condition will change when the ambient temperature changes. Thus, when an inexpensive Bourdon tube gauge without temperature compensation is utilized to measure the pressure of the fire suppressant fluid, the ambient temperature must be measured and a correction chart must be utilized not only to correct for temperature-induced errors in the Bourdon tube gauge, but also to convert the actual pressure measured at any particular ambient temperature to the corresponding fluid pressure at a reference ambient temperature.

U.S. Pat. No. 4,143,545, issued Mar. 13, 1979 to Sitabkhan describes a Bourdon tube pressure gauge assembly for measuring the fullness of a fire extinguisher tank. In this assembly, a Bourdon tube is disposed within a sealed container containing a pressurized fluid having substantially the same pressure-temperature response characteristic as the fluid within the fire extinguisher tank which is supplied to the interior of the Bourdon tube. The reference fluid is maintain at the same temperature as the working fluid, so that the differential pressure measured by the Bourdon tube assembly between the interior and exterior surfaces of the Bourdon tube will be an indication of the mass or charge of fluid within the fire extinguisher tank.

OBJECTS AND SUMMARY OF THE INVENTION

It is an object of the invention to provide a relatively simple and inexpensive temperature compensated Bourdon tube gauge.

It is another object of the invention to provide a Bourdon tube pressure gauge which will automatically compensate for errors cause by variations in the ambient temperature.

It is still another object of the invention to provide a temperature-compensated Bourdon tube gauge for accurately indicating the relative fullness of a closed container containing a pressurized fluid, despite variations in ambient temperature.

The temperature-compensated Bourdon tube gauge for indicating a parameter of a pressurized fluid, according to the invention, includes a support structure and a conventional Bourdon tube having one end affixed to the support structure and connected to receive the pressurized fluid to be measured, and having a opposite free closed end. An indicating member is connected to the free end of the Bourdon tube so that movement of this free end causes a corresponding movement of the indicating member relative to the support structure. A dial member, which is disposed behind the indicating member, includes a front surface extending parallel to the path of motion of the indicating member. This front surface of the dial member has parameter scale graduations disposed adjacent and extending along the path of motion of the indicating member. The gauge also includes a temperature-responsive member for moving the dial member in accordance with a value of temperature sensed by this temperature-responsive member such that the parameter scale graduations adjacent the indicating member indicates the parameter of the pressurized fluid being measured.

For example, when the Bourdon tube gauge is of conventional construction in which the indicating member includes a pointer which is moveable along a circular path about an axis of the support structure by the free end of the Bourdon tube to which it is connected, the dial member will be pivotally connected to the support structure for rotary movement about this axis by the temperature-responsive member. In a first embodiment of the invention, the temperature-responsive member is a bimetallic element extending spirally about the support structure axis from an inner end affixed to the support structure to an outer end which is pivotly connected to the dial member.

When the parameter to be measured is the pressure of the fluid supplied to the Bourdon tube, the bimetallic element is designed to position the dial member so as to compensate for any temperature-induced error in the position of the pointer occurring when the ambient temperature varies from the ambient temperature at which the gauge was calibrated.

When the parameter to be measured is the pressure of the fluid supplied to the Bourdon tube at a predetermined reference temperature, the bimetallic element is designed to rotate the dial member relative to the pointer not only to compensate for temperature-induced error in the disposition of the pointer but also to convert the fluid pressure at the sensed temperature to the corresponding fluid pressure at the reference temperature.

In a second embodiment of the invention, the dial member includes an opening therethrough in the form of a radially-extended slot, and the temperature-responsive member includes a cam, a bimetallic element, and a lever. The cam is affixed to the support structure and includes a curved cam surface extending about the support structure axis. The bimetallic element extends spirally about the support structure axis from an inner end affixed to the support structure to an outer end pivotly connected to one end of the lever. The lever extends across the cam surface to an opposite end which extends into the slot of the dial member so that this lever is moveable in rotation and translation with respect to the dial member. A restaining member, such as a spring connected between the lever and the support structure, is used to maintain the lever in contact with the cam surface, which serves as a variable fulcrum for the lever. The position of this fulcrum between the two ends of the lever is determined by the shape of the cam surface and the position of the outer end of the bimetallic element. This cam surface can be shaped and the bimetallic element can be designed so that the parameter scale graduations on the dial member adjacent the indicating member accurately indicates the parameter of the pressurized fluid being measured. This embodiment of the invention is especially suited to measuring the fullness of a closed tank containing a pressurized fluid whose pressure varies non-linearly with temperature.

Any type of Bourdon tube and indicating member assembly may be used in the present invention. However, this invention is especially suitable for use with the relatively simple and expensive combination of a spiral multiconvolution Bourdon tube and an indicator pointer affixed to or integral with the free outer end of the Bourdon tube, such as described in the above-referenced U.S. Pat. No. 3,641,820.

BRIEF DESCRIPTION OF THE DRAWINGS

The invention will be better understood, and further objects, features, and advantages thereof will become more apparent from the following description of preferred embodiments, taken in conjunction with the accompanying drawings in which.

DESCRIPTION OF PREFERRED EMBODIMENTS

Figure 1:
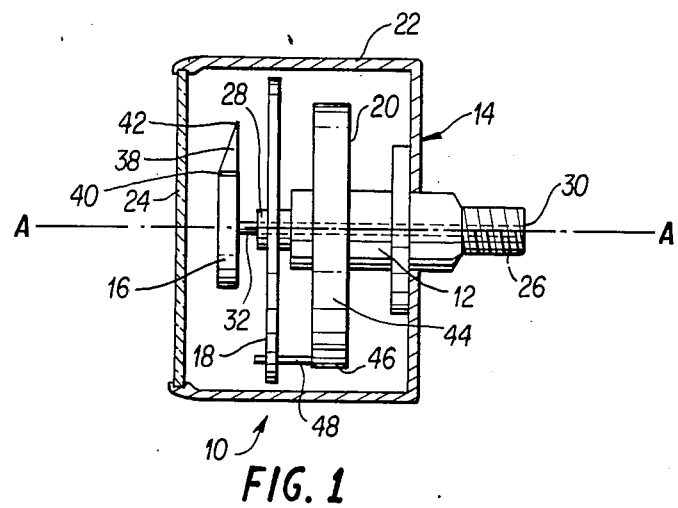
FIG. 1 is a side view partially in section of a first embodiment of the invention.
Figure 2:
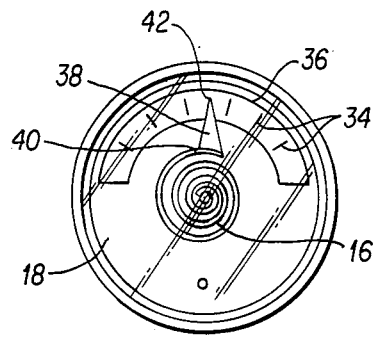
FIG. 2 is a front view of the embodiment shown in FIG. 1.
Figure 3:
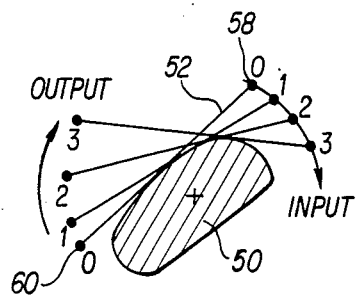
FIG. 3 is a side view partially in section of a second embodiment of the invention.

The Bourdon tube gauge 10 shown in FIGS. 1 and 2 includes a support member 12 which receives and supports the remaining elements including a housing 14, a Bourdon tube 16, a dial plate 18, and a bimetallic element 20. Housing 14 includes a hollow generally cylinderical case 22 and a transparent cover 24.

The support member 12 includes a bore 26 which extends along an axis A—A from an interior end 28 of the support member 12 to an exterior end 30, which is threaded or serrated for connection to a pressure line or system.

The Bourdon tube 16, which is similar to that described in the above-referenced U.S. Pat. No. 3,641,820, includes a fixed open end 32 which extends into the bore 26 and is secured to the interior end 28 of the support member 12. The Bourdon tube 16 is of a spiral multiconvolution construction axially supported slightly forward of the dial plate 18. The front surface of the dial plate 18 includes a plurality of graduations 34 extending in a circular path about the axis A—A to form a pressure scale 36. An indicating member or pointer 38, which is affixed to or integral with the free closed end 40 of the Bourdon tube 16, extends radially of the axis A—A to a pointer end 42 adjacent the pressure scale 36 of the dial plate 18. By this arrangement, the pointer end 42 will move relative to the pressure scale 36 to indicate pressure variations to which the Bourdon tube 16 is caused to response.

The bimetallic element 20 extends spirally about the axis A—A from an inner end 44 which is connected to the support member 12 to an outer end 46 which is pivotally connected to an axially-extending pin 48 carried by the dial plate 18. The dial plate 18 is pivotally mounted to the support member 12 so that its angular disposition about the axis A—A is determined by the bimetallic element 20 to which it is pivotally attached by the pin 48. The bimetallic element 20 is designed to compensate for any temperature-induced error of the gauge 10 which occurs when the ambient temperature varies from the ambient temperature of which the pressure gauge is calibrated. Thus, the angular disposition of the dial plate 18 is determined by the bimetallic element 20 such that the pointer end 42 indicates on the pressure scale 36 the correct value of pressure of the pressurized fluid supplied to the Bourdon tube 16 through the bore 20 of the support member 12.

The Bourdon tube gauge 10 can also be used to measure the fullness of a tank containing a pressurized fluid. Since the pressure of a gaseous fluid within a closed tank varies directly as the temperature of the fluid, the fullness of the tank can be described as the fluid pressure at a given fluid temperature. Thus, the tank is considered fully charged when the fluid contained therein is at a given pressure and temperature. When the Bourdon tube gauge 10 is utilized to determined the fullness of a tank containing a pressurized fluid, the bimetallic element 20 is designed not only to compensate for temperature-induced errors in the gauge itself, but also to convert the actual fluid pressure at any particular temperature to the corresponding fluid pressure at a reference temperature at which the "full charge" pressure of the tank is known. In this way, the pointer end 42 will always indicate on the pressure scale 36 the pressure of the pressurized fluid within the closed tank at a predetermined reference temperature. Also, since the ratio of the indicated pressure at the reference temperature to the "full charge" pressure at the same reference temperature is an indication of the fullness of the tank, the scale 36 can be calibrated in terms of charge or fullness, rather than pressure.

When the pressurized fluid within a tank is a simple gaseous fluid which conforms fairly closely to Boyle's law, the pressure of the fluid will vary approximately linearly with its temperature. However, in some stored pressurized fluids, such as the fire suppressant fluid "Halon 1301" or bromotrifluoromethane, the fluid temperature varies non-linearly with its temperature. The embodiments of the invention shown in FIGS. 3–8 can be utilized to measure the fullness of a tank containing such a non-linear pressurized fluid.

Figure 4:
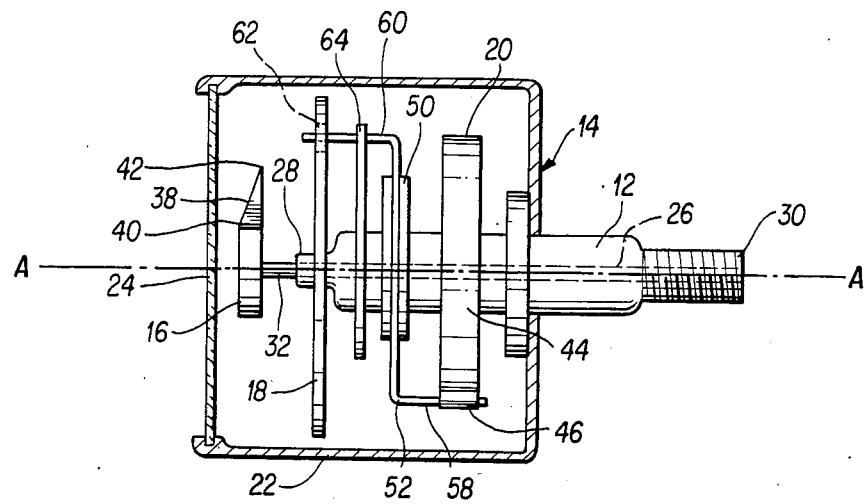
FIG. 4 is a simplified diagram of the cam and lever combination in the embodiment of FIG. 3 showing the movement of the lever relative to the cam.

The embodiment shown in FIG. 4 differs from the embodiment in FIG. 1 in that it utilizes a cam 50 and a lever 52 to alter the input (from the bimetallic element 20) to output (to dial plate 18) displacement ratios. By varying the shape of the cam 50, one could tailor fit a desired input to output displacement curve corresponding to the non-linear variation of pressure with temperature of the pressurized fluid being measured. This is illustrated in the lever movement diagram of FIG. 3. As shown in this FIG. 3, equal input displacements of the lever 52 results in three different output displacements of this lever. The cam 50 behaves like a "variable fulcrum".

Figure 5:
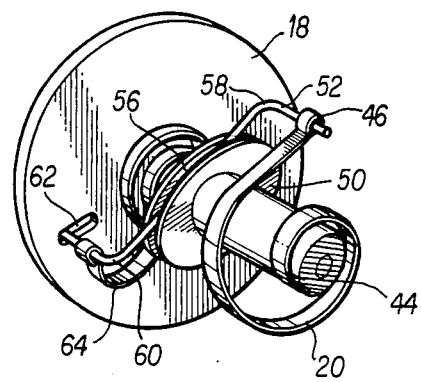
FIG. 5 is a partial exploded view of the embodiment of FIG. 3, showing a perspective view of the temperature-responsive assembly.
Figure 6:
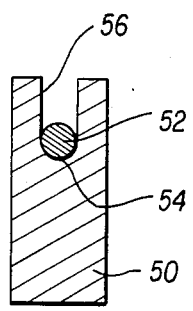
FIG. 6 is a partial cross section view of the cam shown in FIG. 5.

Referring now to FIGS. 4–6, the cam 50 is affixed to the support member 12 and includes a curved peripheral surface 54 which includes a groove 56 for receiving the lever 52. An input end 58 of the lever 52 is pivotally connected to the outer end 46 of the bimetallic element 20. An output end 60 of the lever 52 extends through a radially-extending slot 62 of the dial plate 18 so that the lever 52 is moveable in rotation and translation with respect to the dial plate 18. A spiral spring 64, having an inner end affixed to the support member 12 and an outer end extending about the output end 60 of the lever 52, exerts a force on the lever 52 to maintain this lever in contact with the cam 50 within the groove 56.

Figure 7:
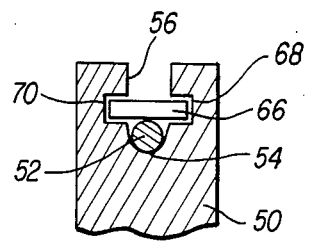
FIG. 7 is a partial cross section view of the cam in a variation of the embodiment of FIG. 3.
Figure 8:
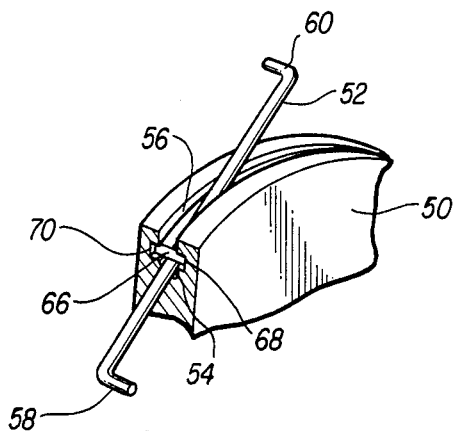
FIG. 8 is a partial perspective view of the cam and lever combination of FIG. 7.

In a variation of the embodiment of FIG. 4, shown in FIGS. 7–8, a roller bearing 66 serves as a lever follower element to maintain contact between the cam 50 and the lever 52. In this variation, opposite ends of the roller bearing extend respectively into two slots 68, 70 formed on opposite sides of the cam groove 56 so as to maintain the roller bearing 66 in contact or at least in very close proximity to the lever 52 disposed within the cam groove 56. Thus, when the input end 58 of the lever 52 is moved by the bimetallic element 20, the roller bearing 66 prevents the lever 52 from being lifted out of the cam groove 56. As the lever 52 is rotated about the cam 50, it causes the roller bearing 66 to move along its cam track determined by the slots 68, 70 so that this roller bearing 66 is always disposed above the fulcrum contact point of the lever 52 with the cam 50.

There are numerous variations of the invention in addition to the specific embodiments described herein. For example, the Bourdon tube may be connected to an indicating pointer by a gear and linkage drive, such as described in the above-referenced U.S. Pat. No. 2,387,909 and U.S. Pat. No. 3,004,434, or by a gearless drive linkage, such as described in U.S. Pat. No. 3,127,771, issued Apr. 7, 1964 to Diehl. Also, the dial member may be cylindrical or semi-cylindrical in shape, with the graduated pressure scale being disposed on its outer periphery and the indicating pointer attached to the Bourdon tube having an axially-extending end portion adjacent the graduated scale.

In the preferred embodiments on the invention described above, it is assumed that the temperature of the Bourdon tube and the pressurized fluid is essentially the same as the ambient temperature sensed by the bimetallic element. In applications in which either the ambient temperature or the fluid temperature changes rapidly, it may be desirable to form the bimetallic element as a helical element disposed about the fluid passage 26 within a thermally insulating tube so that the temperature sensed by the bimetallic element closely corresponds to the temperature of the Bourdon tube. Where the Bourdon tube is of a type which is connected to the bore 26 by a radial tap, the bimetallic element can be formed as a helical element disposed within the bore 26, in a similar matter as that described in the above-referenced U.S. Pat. No. 3,127,771.

Since there are many variations, modifications, and additions to the invention which would be obvious to one skilled in the art, it is intended that the scope of the invention be limited only by the appended claims.

What is claimed and desired to be secured by Letters Patent of the United States is:

1. A temperature-compensated Bourdon tube gauge for indicating a parameter of a pressurized fluid, comprising:

a support structure, including an axis;

a Bourdon tube having a fixed open end connected to receive said pressurized fluid and affixed to said support structure and having a free closed end;

an indicating member, connected to said free end of said Bourdon tube so that movement of said free end causes a corresponding movement of said indicating member relative to said support structure, said indicating member comprising a pointer which is movable in rotation about said axis by the free end of said Bourdon tube;

a dial member having a parameter scale disposed adjacent and extending along the path of motion of said indicating member, said dial member being pivotally connected to said support structure for rotary movement about said axis; and temperature-responsive means for moving said dial member about said axis in accordance with a temperature sensed by the temperature-responsive means such that said indicating member indicates said parameter on said scale, wherein said temperature-responsive means comprises a bimetallic element having a fixed end attached to said support structure an a free end which is movable along a predetermined path in accordance with a temperature sensed by the bimetallic element, a cam which is affixed to said support structure and which includes a curved cam surface extending about said axis, a lever extending across said cam surface from an input end to an output end, restraining means for maintaining said lever in contact with said cam surface, and connecting means for connecting the lever input end to the free end of said bimetallic element and the lever output end to said dial element so that movement of the free end of said bimetallic element produces a corresponding movement of said dial member about said axis, said cam surface serving as a fulcrum for said lever, the position of said fulcrum varying along the length of the lever in accordance with the position of the free end of said bimetallic element and the shape of said cam surface.

2. A gauge, as described in claim 1, wherein said connecting means comprises
   a pivotable connection between the lever input end and the free end of the bimetallic element; and
   a translatable pivotable connection between the lever output end and the dial member which is translatable along a radially extending path of the dial member.

3. A gauge, as described in claim 2, wherein said translatable pivotable connection comprises a radially-extending slot formed in said dial member, into which the lever output end extends for rotation and translation therein.

4. A gauge, as described in claim 1, wherein said restraining means comprises a spring element connected between said support structure and said lever.

5. A gauge, as described in claim 1, wherein restraining means comprises a lever follower element, which extends across said lever opposite said fulcrum or point of contact between said lever and said cam surface to maintain said contact, said follower element being freely movable by said lever along a path extending parallel to said cam surface so that the follower element moves with said fulcrum along the length of the lever.

6. A gauge, as described in claim 5, wherein:
   said cam includes a peripheral surface which defines a groove extending about said axis, said groove including a bottom portion which constitutes said cam surface maintained in contact with said lever and two opposite side portions which are spaced apart to receive said lever into said groove, each groove side portion defining a slot or recess extending along the groove; and
   said follower element comprises a roller bearing having one end extending into the recess of one groove side portion and having an opposite and extending into the recess of the opposite groove side portion, said recesses serving as a guide or track for the roller bearing as it is moved by said lever.

7. A gauge, as described in claim 1, wherein said parameter is the pressure of said pressurized fluid at said sensed temperature.

8. A gauge, as described in claim 1, wherein said parameter is the pressure of said pressurized fluid at a predetermined reference temperature.

9. A gauge, as described in claim 1, wherein said pressurized fluid is disposed within a closed container and said parameter is the mass of said pressurized fluid within said container relative to the mass of pressurized fluid within the container when the container is fully charged.

10. A gauge, as described in claim 1, wherein:
    said Bourdon tube is a spiral multiconvolution tube extending about said axis; and
    said pointer is affixed to or integral with the free end of said Bourdon tube.

11. A temperature-compensated Bourdon tube gauge for indicating a parameter of a pressurized fluid, comprising:
    a support structure, including an axis;
    a Bourdon tube having a fixed open end connected to receive said pressurized fluid and affixed to said support structure and having a free closed end;
    an indicating member, connected to said free end of said Bourdon tube so that movement of said free end causes a corresponding movement of said indicating member relative to said support structure, said indicating member comprising a pointer which is movable in rotation about said axis by the free end of said Bourdon tube;
    a dial member having a parameter scale disposed adjacent and extending along the path of motion of said indicating member, said dial member being pivotally connected to said support structure for rotary movement about said axis;
    a bimetallic element having a fixed end attached to said support structure and a free end which is movable along a predetermined path in accordance with a temperature sensed by the bimetallic element; and
    a cam assembly, actuated by the bimetallic element, for moving said dial member about said axis such that the indicating member indicates said parameter on said scale, said cam assembly comprising
    a cam which includes a curved cam surface extending about said axis and which is connected to one of said support structure, said bimetallic element free end, and said dial member,
    a lever which extends across said cam surface and which includes two spaced-apart points connected respectively to the other two of said support structure, said bimetallic element free end, and said dial member, and
    restraining means for maintaining said lever in contact with said cam surface.

* * * * *